July 7, 1964        H. G. NOLLER        3,139,746
GAS DENSITY MEASURING
Filed May 10, 1961
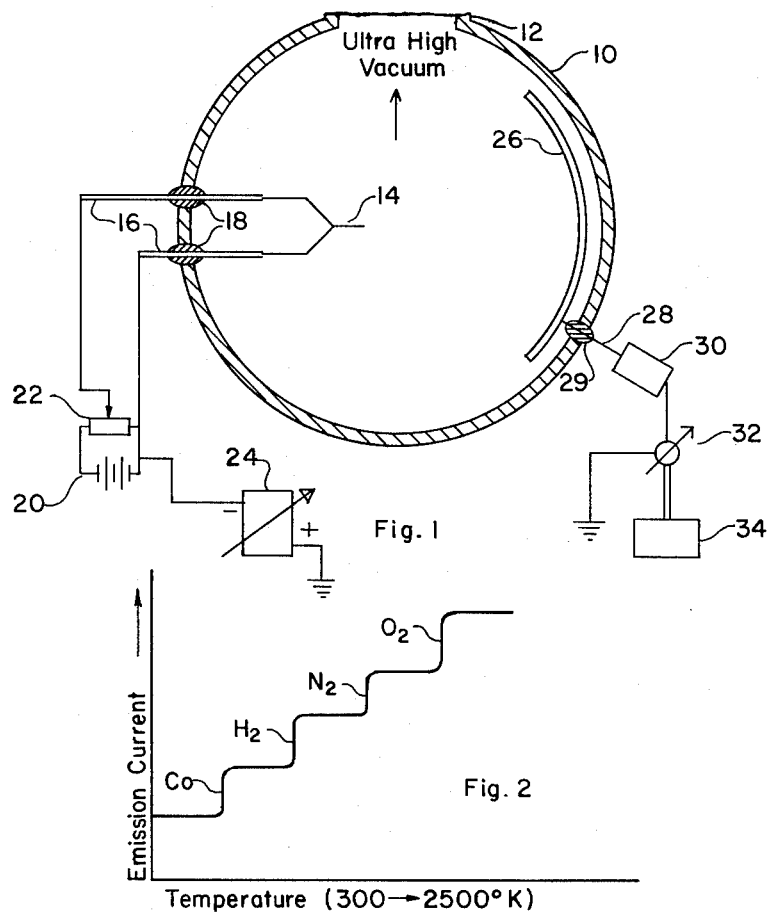
INVENTOR.
BY

United States Patent Office 3,139,746
Patented July 7, 1964

3,139,746
GAS DENSITY MEASURING
Hans Georg Noller, Cologne, Germany, assignor to National Research Corporation, Cambridge, Mass., a corporation of Massachusetts
Filed May 10, 1961, Ser. No. 109,033
8 Claims. (Cl. 73—30)

This invention relates to vaccum measuring and more particularly to a procedure and device for determining density of incidents of active gases on a surface under high vacuum.

One important object of this invention is to provide a process for the measurement of low pressure gases and composition thereof.

Another object of this invention is to provide a device for carrying out the above-described process.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIG. 1 is a schematic, diagrammatic, illustration of one preferred embodiment of the invention;

FIG. 2 is a schematic representation of a desorption curve; and

FIG. 3 is a schematic representation of an adsorption curve.

In systems where a relatively high vacuum is maintained (on the order of $10^{-9}$ or higher), the known pressure measuring methods fail. For example, the ionization gauge measuring device encounters difficulties stemming from the fact that, due to the increased free molecular path and the decreased number of gas molecules, the number of ionized molecules do not constitute a sufficient amount for direct determination of pressure.

One method for the measurement of the incident density of active gas molecules is known as the flashfilament method wherein a tungsten filament is cleaned by heating to a high temperature, and then during a socalled "cold period" the filament becomes covered with adsorbed gas molecules. During this "cold period" the formation of an adsorption layer, of monomolecular thickness, takes place at the tungsten filament. The tungsten filament is then heated up and the adsorbed gas molecules desorb, thus causing a pressure rise, which can be measured directly by an ionization gauge. This pressure rise after a certain "cold period" time is characteristic for each pressure level in the system and constitutes a measure of the normal density of the gaseous layer. In this manner, the normal density of an active gaseous layer can be determined on a surface and therefore, indirectly, the pressure can be determined in the surrounding vacuum system. This method fails, however, for inert gases, which do not show adsorption tendencies at high temperatures or at room temperatures.

It has been proposed that the heating up of the tungsten filament in the above-described procedure should not be in a sudden and stepwise fashion, but that it should be slow (for example: a rate of temperature change of 30°/sec.). In this manner, the gas components adsorbed to the surface would desorb according to the different desorption energies at different temperatures; i.e., at different time intervals. At determined temperature values, the pressure peaks resulting in the measured space are measured with an ion gauge. From the position of the pressure peaks, it is possible, with the help of a calibrated chart, where the time scale is divided into degrees of temperature, to determine the kind of the gas and the amount, which in turn determines the normal density of the corresponding components of the gas mixture.

This method has several notable disadvantages which take place during the measuring process. The unavoidable pressure rise during desorption is undesirable for some processes taking place in the high vacuum. Furthermore, it is impossible, by this method, to determine the normal density during the adsorption process. Thus, the required "cold period" for adsorption can be ascertained only by prolonged experiments. A further disadvantage is present when a hot-filament ionization gauge (Alpert gauge) is used to measure the pressure. The hot filament heats the gases drastically, which may cause objectionable chemical reactions to occur, to the detriment of the gas or gauge. In accordance with the present invention, whereby the foregoing disadvantages are overcome or circumvented, the gas molecules are adsorbed onto the surface of an emitting material and the changes in the electron work function of the surface that result when a layer of gas is adsorbed on the surface are measured. Since the components of a gas have different adsorption and desorption energies, the amount and kind of individual gas components can be determined by calibrating the resulting changes in work function. The density of the corresponding components can then be determined. Measurement of the work function is of particular advantage since it enables density measurements to be made during adsorption, "cold period," or during desorption, "heating up." Thus, measurement of the work function during adsorption can be accomplished with a minimum of disturbance of any process taking place in vacuum.

In a preferred embodiment of the invention, the work function is measured by measuring the changes of the field emission currents from a tiny point of an emitting material such as tungsten. The emission of a point electrode is a function of the surface condition of the point or emitting tip. Thus, the emission current can be utilized as a measure of the adsorbed or desorbed gases at the tip. Any change in the adsorbed layer during the "cold period" or during the "heating up" period, which is preferably linearly proportional to time, would be reflected in corresponding changes in the emission current. The emission current I in amperes from a tiny point of an emitting material has the value $I = AXE^2 \cdot 10^{-B\phi^{3/2}/E}$ where A is the area of the emitting tip, X and B are constants, E is the field strength and $\phi$ is the work function. The emission current is picked up by a collecting electrode suitably positioned from the emitting tip. Where a sufficiently small tip or point is employed, desorption of the gas layer will have a negligible effect on the vacuum conditions.

The work function can also be measured on the individual crystal planes of a tip formed of a single crystal. The emission current from each plane is preferably picked up by individual collecting electrodes which are preferably electrically insulated from each other. In this manner the measurement of work function takes place in the circuit of only one or several collecting electrodes depending on the change of surface condition of the crystal planes. Thus, the adsorption of various hydrocarbons, for example, on the crystal planes can be measured by the change in work function of the individual adsorbing crystal plane. In this case, the total emission current, which is the sum of all the individual currents, would not need to be measured.

Where refractory metals are utilized as the emitting tip, a particular difficulty develops when hydrocarbons are present in the gas mixture which is to be investigated. During the relatively slower heat up period (as compared to the flash filament method) hydrocarbons tend to decompose instead of desorbing. The resulting decomposition products, for example hydrogen, desorb while carbon either diffuses into the metal and/or forms carbides which remain at the surface of the tip and only at very high temperatures will the carbides distribute themselves evenly on the surface and into the metal of the tip. The residual carbon at the surface or diffused in the tip will be freed only when gases containing oxygen, such as water vapor, are adsorbed on the tip. The resulting carbon monoxide will desorb and therefore erroneous measurements will result.

In accordance with the present invention, carbon is prevented from diffusing into the metal of the tip by coating the metal with an oxide layer having a high melting point and low vapor pressure. Oxides such as aluminum oxide and thorium oxide are suitable.

In carrying out the present invention, the temperature change during cold period and heat up period is preferably proportional to time. The temperature range is preferably between 300° K. and 2500° K. While the temperature change is preferably on the order of 30°/sec., the temperature change can be carried out by stepwise, short time intervals. At the beginning of the measurement, the emissive tip is preferably heated to a temperature of about 2000 to 2500° K. to remove all volatiles which are volatilized at this temperature. During this outgassing, the emission current attains its maximum value. During the cooling and during the "cold period" the emission current decreases due to adsorption in a stepwise manner as illustrated in FIG. 3. During the heat up period, the emission current increases in a step-wise manner (FIG. 2) as desorption occurs until the emission current has reached its original maximum value. From the position along the temperature axis and the height of the emission current, the kind and quantity, respectively, of gases present in the system can be determined from previously calibrated curves.

One preferred embodiment of the invention is illustrated at FIG. 1 wherein 10 is a vacuum-tight chamber or tank which is evacuated through conduit 12 by a suitable pumping system, not shown. Within tank 10 there is a tiny point 14 of emissive material which preferably has a point radius of about 1 micron. The emissive material is connected by leads 16 through seals 18 to a current source 20 including a variable resistance 22. The current source 20 is connected to a high voltage source 24 capable of supplying about 8000 volts. A collector electrode 26 is positioned within chamber 10 to collect the electrons emitted from the emissive point 14. Electrode 26 is connected by a lead 28 through a vacuum seal 29 to a resistance 30 and ammeter 32. The ammeter 32 is connected to a suitable recording instrument 34, such as, for example, cathode ray tubes which provide instantaneous visual information as to the kind and quantity of the individual components of the gas mixtures.

While the invention has been described with respect to preferred embodiments thereof, numerous alternative embodiments may be employed without departing from the invention. For example, changes in the work function can be measured by such methods as thermionic emission, photoelectric effect and electrode potentials. Additionally, the collector electrode can be a plurality of electrodes, suitably insulated. Also, the collector electrode or electrodes can be a conductive coating applied to the chamber wall.

Since certain changes may be made in the above apparatus and process without departing from the scope of the invention herein involved, it is intended that all matter contained in the above description, or shown in the accompanying drawing, shall be interpreted as illustrative and not in a limiting sense.

What is claimed is:

1. The process of measuring the density of gases in high vacuum comprising adsorbing a layer of gas on the surface of a point electrode of emissive material, heating said emissive point from about 300° K. to 2500° K. at a rate which is linearly proportional to time to sequentially desorb the components of said gas layer, measuring the changes in work function resulting from said desorption process by measuring the emission current from said point as a function of the temperature of said point so that the information can be plotted as a curve having a temperature axis and an emission current axis wherein the distance along the emission current axis provides the quantitative density of the various gas components and the distance along the temperature axis provides the qualitative identification of the various gas components.

2. The process of measuring the density of gases in high vacuum comprising adsorbing a layer of gas on the surface of a point electrode of emissive material, heating said emissive point from about 300° K. to 2500° K. at a rate of about 30°/second to sequentially desorb the components of said gas layer, measuring the changes in work function resulting from said desorption process by measuring the emission current of said point as a function of the temperature of said point so that the information can be plotted as a curve having a temperature axis and an emission current axis wherein the distance along the emission current axis provides the quantitative density of the various gas components and the distance along the temperature axis provides the qualitative identification of the various gas components.

3. The process of measuring the density of gases in high vacuum comprising heating a point electrode of emissive material to a temperature of about 2500° K. to remove gases which are volatile at said temperature, cooling said electrode at a rate which is linearly proportional to time to sequentially adsorb the components of said gases, measuring the changes in work function resulting from said adsorption process by measuring the emission current from said point electrode as a function of the temperature of said point so that the information can be plotted as a curve having a temperature axis and an emission current axis wherein the distance along the emission current axis provides the quantitative density of the various gas components and the distance along the temperature axis provides the qualitative identification of the various gas components.

4. A device for measuring the density of gases in a high vacuum chamber comprising a surface for adsorbing a layer of gases comprising a point electrode of emissive material, means for heating said emissive material from 300° K. to 2500° K. to sequentially desorb components of said gas layer, a collector electrode for measuring the change of emission current of said emissive point, means for generating a voltage between said point electrode and said collector electrode and means for recording the output of said collector electrode as a function of the temperature of the emissive material so that the information can be plotted as a curve having a temperature axis and an emission current axis wherein the distance along the emission current axis provides the quantitative density of the various gas components and the distance along the temperature axis provides the qualitative identification of the various gas components.

5. A device for measuring the density of gases in a high vacuum chamber comprising a surface for adsorbing a layer of gases comprising a point electrode formed of a single crystal of emissive material having a plurality of crystal planes, means for heating said emissive material from 300° K. to 2500° K. to sequentially desorb components of said gas layer, a plurality of collector electrodes for individually measuring the change of emission current from said crystal planes, means for generating a voltage between said point electrode and said collector electrodes and means for recording the output of said collector electrodes as a function of the temperature of the emissive material so that the information can be plotted as a curve having a temperature axis and an emission current axis wherein the distance along the emission current axis provides the quantitative density of the various gas components and the distance along the temperature axis provides the qualitative identification of the various gas components.

6. The process of measuring the density of gases in high vacuum comprising adsorbing a layer of gas on the surface of the material, heating said surface to sequentially desorb the components of said gas layer, measuring the changes in the work function of said surface resulting from said desorption process as a function of the temperature of said surface so that the information can be plotted as a curve having a temperature axis and a work function axis wherein the distance along the work function axis provides the quantitative density of the various gas components and the distance along the temperature axis provides the qualitative identification of the various gas components.

7. The process of measuring the density of gases in high vacuum comprising adsorbing a layer of gas on the surface of an emissive material, heating said emissive material to sequentially desorb the components of said gas layer, measuring the changes in the work function resulting from said desorption by measuring the changes of emission current from said surface as a function of the temperature of the emissive material so that the information can be plotted as a curve having a temperature axis and an emissive current axis wherein the distance along the emission current axis provides the quantitative density of the various gas components and the distance along the temperature axis provides the qualitative identification of the various gas components.

8. A device for measuring the density of gases in a high vacuum chamber comprising a surface for adsorbing a layer of gases within said chamber, means for heating said surface to sequentially desorb the components of said gas layer, means for measuring the changes in work function of said surface as a function of the temperature of said surface so that the information can be plotted as a curve having a temperature axis and a work function axis wherein the distance along the work function axis provides the quantitative density of the various gas components and the distance along the temperature axis provides the qualitative identification of the various gas components.

References Cited in the file of this patent

UNITED STATES PATENTS

| | | |
|---|---|---|
| 2,745,278 | Roberts et al. | May 15, 1956 |
| 2,961,601 | Baughman | Nov. 22, 1960 |

OTHER REFERENCES

Radio Engineering, by Terman, McGraw-Hill Book Co., Inc., New York, 1937 (pages 103–110, particularly page 104).